United States Patent [19]

Kejha

[11] Patent Number: 5,443,602
[45] Date of Patent: Aug. 22, 1995

[54] APPARATUS AND METHOD FOR AUTOMATIC MASS PRODUCTION AND PACKAGING OF ELECTROCHEMICAL CELLS

[76] Inventor: Joseph B. Kejha, c/o Hope Technologies, Inc., 3701 Welsh Rd., Willow Grove, Pa. 19090-1293

[21] Appl. No.: 302,536

[22] Filed: Sep. 8, 1994

[51] Int. Cl.[6] .................. B23P 19/00; H01M 6/00
[52] U.S. Cl. ............................. 29/730; 29/623.1
[58] Field of Search ............ 29/729, 730, 731, 623.1

[56] References Cited

U.S. PATENT DOCUMENTS

| | | | |
|---|---|---|---|
| 4,510,682 | 4/1985 | Sabatino et al. | 29/623.1 |
| 5,227,264 | 7/1993 | Duval et al. | 29/730 X |

*Primary Examiner*—Anthony Skapars
*Attorney, Agent, or Firm*—Z. T. Wobensmith, III

[57] ABSTRACT

Apparatus and method for automatic mass production and packaging of electrochemical cells where a current collector web with attached masked terminals is rolled onto a spool, which spool is placed in a cathodic coating machine where the web is pulled through a dip tank for coating and then pulled vertically through a solidification tower, the terminals are unmasked, an insulating plastic net is provided in an electrolyte coating chamber where it is pulled through a dip tank filled with liquid polymer electrolyte and is laid on top of the cathode web while still wet and tacky, and then travels through a solidification chamber after which an adhesive tape carrying leaf anodes is laid on top, pressed together to form cell assemblies which are cut between the anode leafs to form individual cell assemblies, which are picked up, stacked into multiple packs, heat sealed in a plastic coated metal foil bag which is inserted into a hard casing. Similar but expanded apparatus and methods for hi-cells or bi-polar batteries mass production are also described, where the anode carrying tape is omitted and additional layers are added to form bi-cells or bi-polar electrochemical devices. The operations may take place in an inert environment.

27 Claims, 5 Drawing Sheets

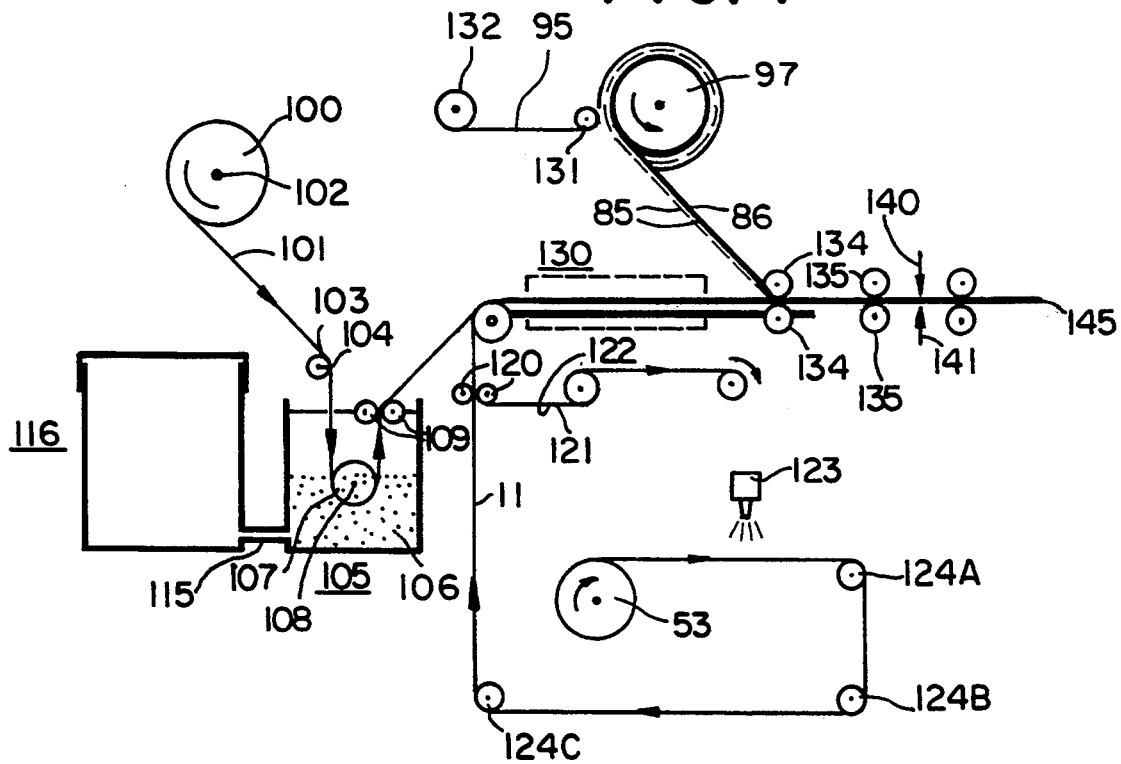
FIG. 1
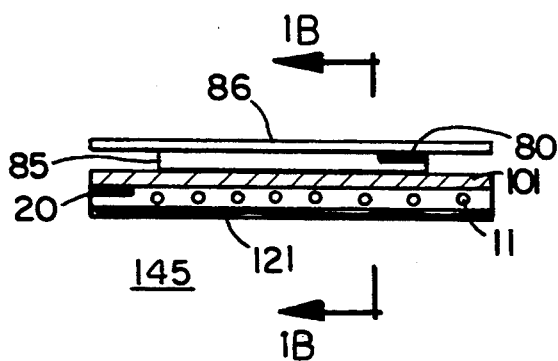
FIG. 1A
FIG. 1B
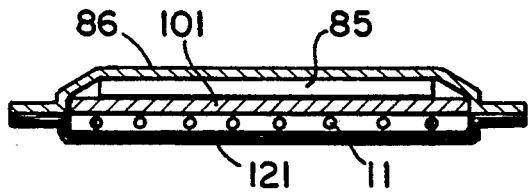
FIG. 3

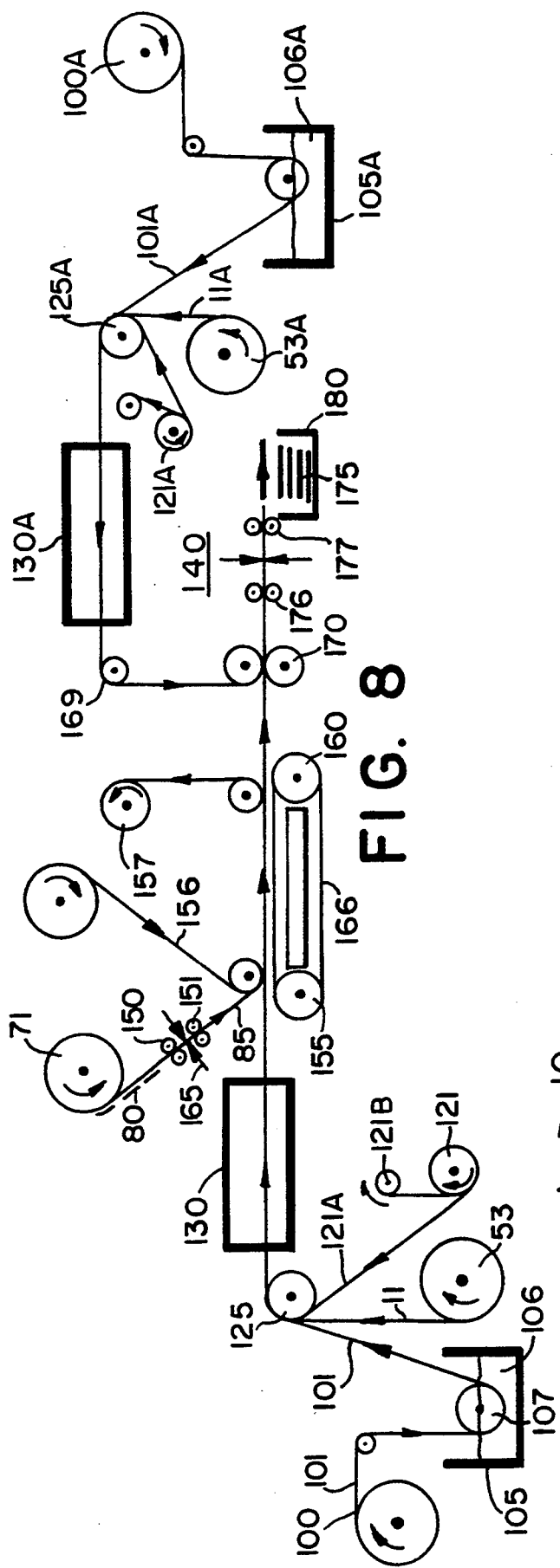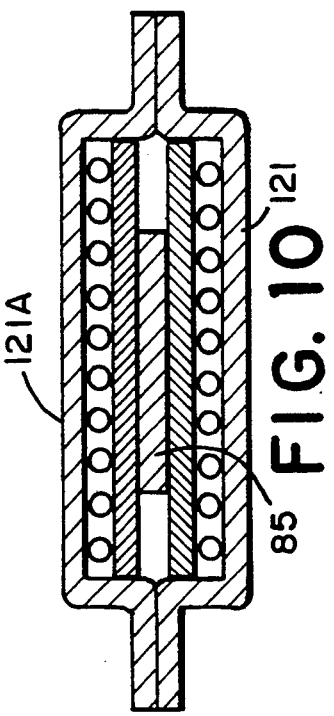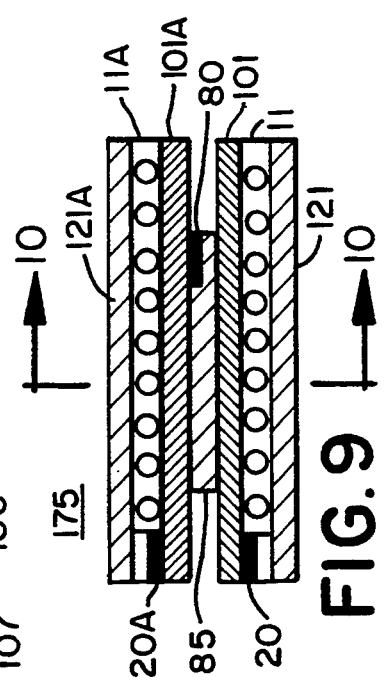

APPARATUS AND METHOD FOR AUTOMATIC MASS PRODUCTION AND PACKAGING OF ELECTROCHEMICAL CELLS

CROSS REFERENCE TO RELATED DOCUMENTS

The subject matter of this invention is shown and described in the Disclosure Document of Joseph B. Kejha, Ser. No. 357,788 filed on Jun. 27, 1994.

BACKGROUND OF THE INVENTION

1. Field of the Invention

This invention relates to an apparatus and method for automatic mass production and packaging of electrochemical cells, where cathodes and leaf anodes with attached terminals are carried on webs or adhesive tapes which are rolled onto spools. An insulating plastic net is placed in an electrolyte coater, unrolled, and the web is pulled through a tank where it is coated with a liquid polymer electrolyte, the electrolyte-coated net and cathode web are joined, the assembly is solidified, and the top tape with leaf anodes is placed thereon, pressed together and the assembly is cut between anodes to form single cell assemblies, which are stacked, heat sealed in a moisture proof metal foil bag and placed in a hard container.

This invention also relates to a similar but extended apparatus and method for automatic mass production of bi-cells or bi-polar batteries where the top adhesive tape is omitted and additional layers are added to form bi-cell assemblies and/or bi-polar electrochemical devices.

DESCRIPTION OF THE PRIOR ART

In the manufacture of electrochemical devices it is necessary to carefully control the quality and uniform thickness of the finished product. Electrochemical devices such as batteries and fuel cells, and particularly lithium metal batteries, consist of an assembly of at least a cathode layer, an electrolyte layer, an anode layer and terminals. The prior art devices often suffered from variable thickness, non-uniform composition or dispersion of chemicals, dendrite formation, shorting, and other quality control problems. The prior art manufacturing methods involved forming the cathode by extruding or extrusion-coating of cathode material on top of a current collector, and forming the electrolyte by extrusion coating of a polymer on top of the cathode material. The thickness and uniformity of both layers are difficult to control, and the width is limited.

The present invention uses a composite electrolyte construction of uniform thickness, and unlimited width. As the composite electrolyte has a web of insulating net embedded in ion-conductive polymer, the structure does not short, and is highly ion-conductive. The composite cathode of the invention has a net of carbon fibers embedded in the cathodic material, and the current is collected from inside, which is more efficient. The structure is of uniform thickness, and unlimited width by nature of the process. The anode may have similar composite construction and benefits as the cathode, except that the carbon fibers are embedded in an anodic material or a carbon matrix. In the present method, the short-comings of the prior art are overcome and many advantages are obtained.

SUMMARY OF THE INVENTION

It has now been found that an apparatus and method for automatic mass production and packaging of electrochemical cells is available where a spool of current collector with attached terminals is coated with cathode material, a spool of insulating plastic net such as described in Patent Application of Joseph B. Kejha and Stephen F. Hope, Ser. No. 08/286,345 filed Aug. 5, 1994 is fed into liquid electrolyte, laid on and joined to the cathode-coated current collector, solidified, and while still tacky it is joined with an adhesive tape web from a spool which tape carries spaced leaf anodes with terminals attached thereto. The assembly is fed into an optional cutter and cut between anode leafs to form individual single cells. The cells are stacked and heat sealed in a metal foil bag, which is inserted into a hard casing.

To produce bi-cells the adhesive carrier tape of the anodes is omitted, and instead individual anodes with terminals are optionally cut and fed on top of the solidified first composite electrolyte layer. Then the continuous web of second current collector which was coated with a cathode material is joined with a continuous second layer of composite electrolyte on top thereof, and is pressed on top of the anodes by rollers in a mirror image process of the first current collector and first composite electrolyte layers, ending in upside down position as compared to the first two layers, and with the electrolyte layer facing towards the anodes. The assembly is fed into optional cutter and cut preferably between anodes to form individual bi-cells. Similarly, additional layers may be inserted to form a bi-polar batteries or fuel cells. Identical methods may be used for production of single, double, or multiple capacitors, except that the anode and cathode are replaced with two electrodes. If the assemblies are not cut, they may be rolled into "jelly roll" cells.

The principal object of the invention is to provide an apparatus and method for economical automatic mass production and packaging of electrochemical cells or capacitors which provides products of uniform and high quality and consistency, which are highly ion-conductive, shorting and dendrite-proof and have high capacity.

It is a further object of the invention to provide an apparatus which is simple and inexpensive to construct, but reliable in operation.

It is a further object of the invention to provide a method of the character aforesaid which is fast and economical.

It is a further object of the invention to provide a method of the character aforesaid which reduces the risk of contamination and shorting of the electrochemical devices produced by the apparatus of the invention.

Other objects and advantageous features of the invention will become apparent from the accompanying description and drawings.

DESCRIPTION OF THE DRAWINGS

The nature and characteristic features of the invention will be more readily understood from the following description taken in connection with the accompanying drawings forming part hereof in which:

FIG. 1 is a diagrammatic view of an apparatus which assembles and packages single cell electrochemical devices in accordance with the method of the invention;

FIG. 1A is a vertical sectional view of the single cell product of FIG. 1;

FIG. 1B is a vertical sectional view taken approximately on the line 1B—1B of FIG. 1A;

FIG. 3 is a vertical sectional view taken approximately on the line 3—3 of FIG. 2;

FIG. 8 is a diagrammatic view of the apparatus which produces bi-cell assemblies;

FIG. 9 is a vertical sectional view of the bi-cell product of FIG. 8, and

FIG. 10 is a vertical sectional view taken approximately on the line 10—10 of FIG. 9.

It should, of course, be understood that the description and drawings herein are merely illustrative and that various modifications and changes can be made in the structures disclosed without departing from the spirit of the invention.

Like numbers refer to like parts throughout the several views.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Figure 2:
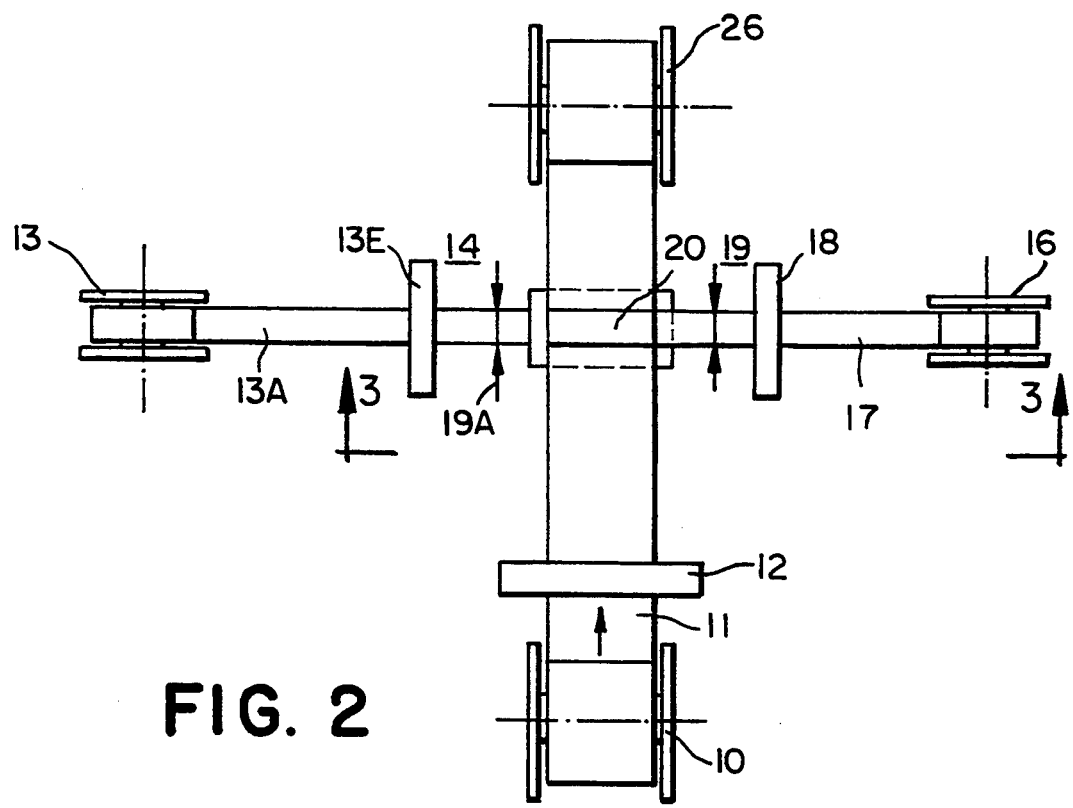
FIG. 2 is a top plan view of the apparatus used to apply terminals to a cathode current collector web.
Figure 2B:
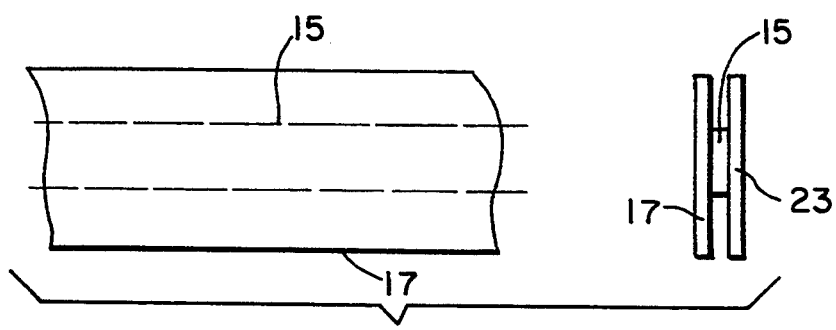
FIG. 2B is an end view of a portion of the apparatus of FIG. 3.
Figure 2C:
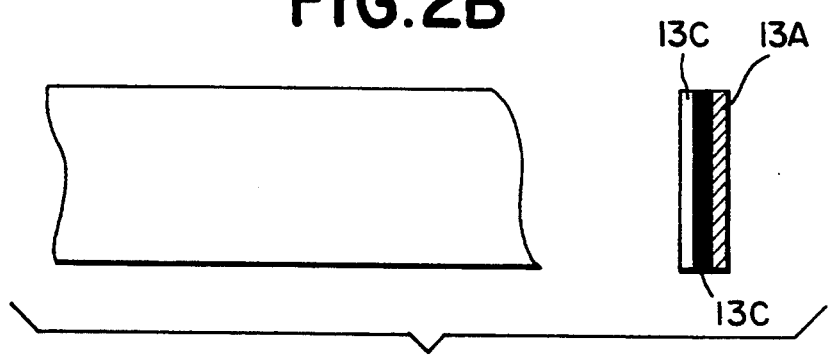
FIG. 2C is an end view of a portion of the apparatus of FIG. 3.

Referring now more particularly to FIGS. 2, 2B, 2C, 3, 4 and 5 of the drawings the manufacture of the cathode portions of electrochemical devices, and particularly for lithium metal batteries is illustrated. The apparatus as shown in FIGS. 2 and 3 includes a spool 10 which may carry a length of carbon fiber non-woven fabric web 11 such as described in U.S. Pat. No. 4,960,655 or other desired current collector such as described in the application of Joseph B. Kejha, Ser. No. 08/281,011 filed Jul. 27, 1994. The web 11 is fed by roller 12 to terminal attaching station 14.

A length of metal foil, such as nickel foil 15, is wound on spool 16, which foil is perpendicular to web 11. The foil 15 has top pressure sensitive masking tape 17 thereon, which is wider than foil 15, and is fed by rollers 18 through a cutter assembly 19 onto the web 11, which cutter cuts the foil 15 into terminals 20, preferably after deposition on top of the web 11 in spaced relation, and pressed thereon by press blocks 21 and 22.

The positioning of the web 11 and the nickel foil 15 is synchronized so that the terminals 20 are spaced apart the required distance and cut to uniform length, which may be longer than the width of web 11.

The foil 15 may have a length of release tape 23 thereon which is removed as the foil 15 passes between rollers 18 prior to cutting, and is taken up by roller 25.

A bottom tape feed station as shown in FIGS. 2, 2A, 2C and 3 may be added. The bottom tape 13A on spool 13 has a pressure sensitive adhesive layer 13B facing the bottom of the current collector web 11 and may have a length of release tape 13C which is taken up by spool 13D. The bottom tape 13A is fed under the web 11 by rollers 13E, preferably simultaneously with foil 15, and is pressed into web 11 by blocks 21 and 22, and is cut by cutter assembly 19A, preferably at the same time as cutter 19. The bottom tape 13A grabs the terminals 20 through the net holes of the web 11 and joins the web 11 and terminals 20 in electroconductive contact, as described in the Patent Application of Stephen F. Hope and Joseph B. Kejha, Ser. No. 08/233,401 filed Apr. 26, 1994. The top masking tape 17 reinforces the attachment, a part, or all of the tape 17 is later removed in demasking device 52.

The foil 15 may also have masking tape 17 on top and the bottom tapes 13 and 13A omitted, and instead have its bottom rough surface coated with a solder metal, such as indium, tin, lead or lithium, or their alloys. The foil 15, after deposition on web 11 as described above, may be pressed by heated or cold blocks 21 and 22, which will cause the solder to flow into the net holes of web 11, encapsulating the web 11, and if heated, cooling will cause the web 11 to be joined to foil 15 or terminal 20 in electroconductive contact.

The web 11 with attached terminals 20 is then rolled onto a spool 26, and further processed if desired.

Figure 4:
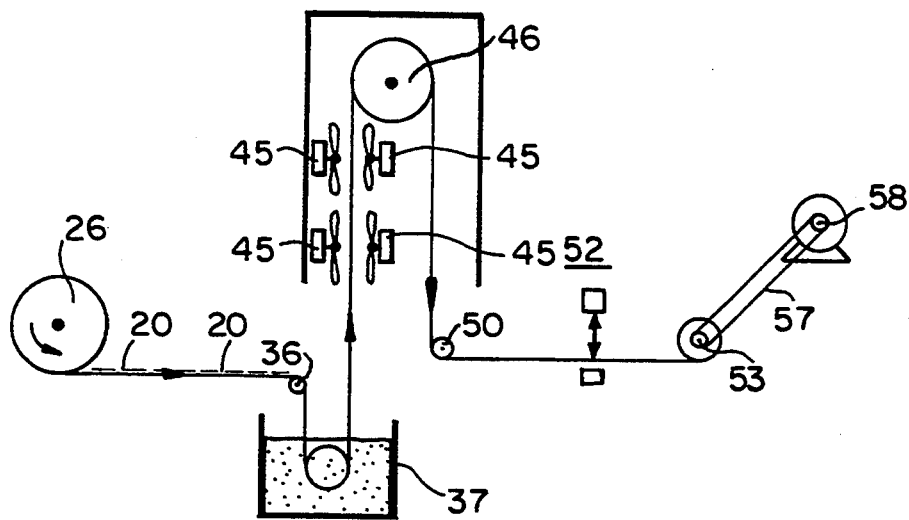
FIG. 4 is a diagrammatic view of the apparatus used to coat the cathode web of FIG. 2 with cathodic material.
Figure 5:
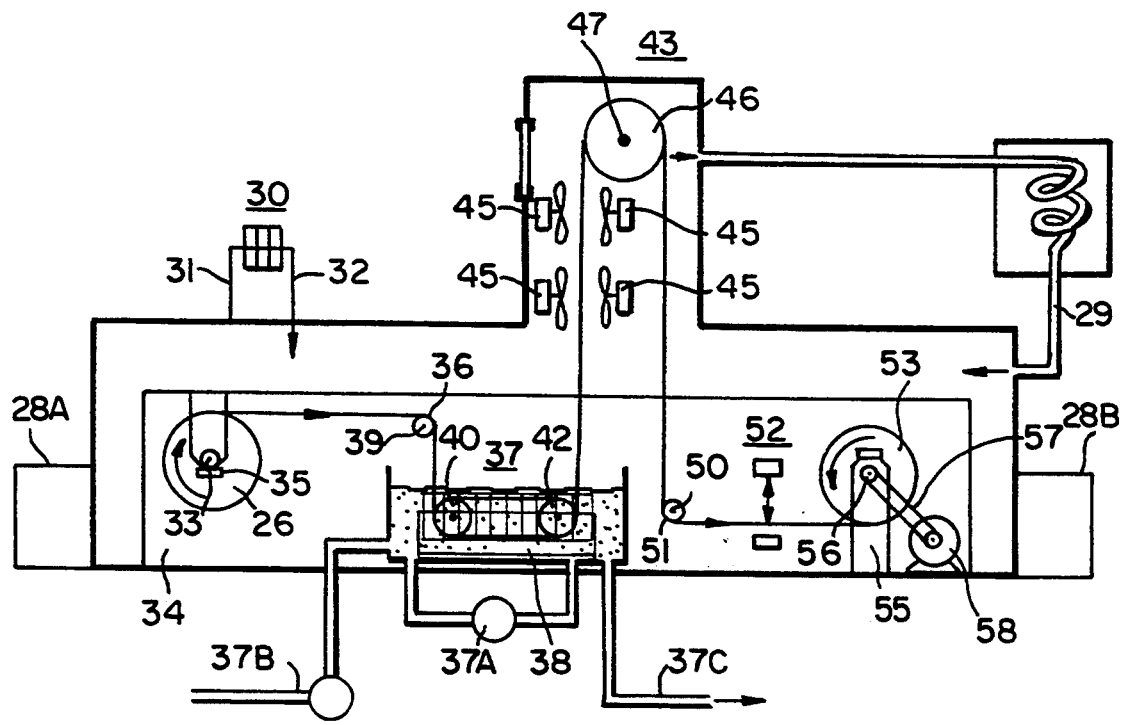
FIG. 5 is a view similar to FIG. 4 but with additional structure.

Referring now to FIGS. 4 and 5, if an alkali metal or other electrochemical devices are to be produced, the spool 26 is placed in a box 27 through antechamber 28A. The box 27 may have a controlled and preferably inert atmosphere, and preferably an argon gas atmosphere which is supplied through pipe 29. The box 27 has a blower and filter 30 of well known type which constantly remove the atmosphere through pipe 31, removes the oxygen, nitrogen, hydrogen and other impurities and recirculates argon back through pipe 32 to box 27.

The spool 26 is carried on shaft 33 in frame 34, which has a friction brake 35 thereon for the controlled unwinding of web 11. Web 11 travels over roller 36 down into a dip tank 37, which contains a liquid mixture of cathode material 38 and solvent or a liquid or a mixture of cathodic material with a liquid polymer electrolyte of well known type. The roller 36 is carried on shaft 39 in frame 34. The web 11 from roller 36 travels under roller 40, which is carried on rack 41 and under roller 42, which is also carried in rack 41 and is coated and encapsulated by mixture 38. The web 11 from roller 42 travels vertically upwardly through a vertical chimney or solidification chamber 43. As it travels, the web 11 is preferably dried by infrared heaters with fans 45, or solidified by other means, and goes over a top roller 46 in chimney 43, by which time the solvent has evaporated and the cathodic material 38 has bonded to the web 11, and dried or has solidified before it touches the upper roller 46. The roller 46 is on shaft 47 which is carried in dryer 43 for free rotation.

The evaporated solvent from the cathodic material may be removed from chamber 43 by pipe 48, separated from the argon in a condenser 49, and reused with another mix of cathode material in a reservoir (not shown).

In the production of non-alkali metal electrochemical devices, the box 27 may be omitted.

The dip tank 37 has a recirculating pump 37A which constantly recirculates the liquid cathode material 38. The tank 37 may also be connected to a reservoir (not shown) by pipes 37B and 37C with a viscosity monitor (not shown) in tank 37 which controls the viscosity of the material supplied thereto.

The web 11 travels downwardly from the roller 46 under roller 50 which is on shaft 51 carried in frame 34. The terminals 20 are partially or fully unmasked by an unmasker device 52 of well known type, which removes sections or all of the masking tapes 17 from the terminals 20. The web 11 is taken up by a driven removable spool 53, which has a shaft 54 carried in bracket 55 with pulley 56 thereon, which is driven by belt 57 or chain or other means (not shown) from motor 58 which is mounted to floor 60. Spool 53 may be stored in a sealed cassette (not shown) and may be moved into and out of box 27 through antechamber 28B.

Figure 6:
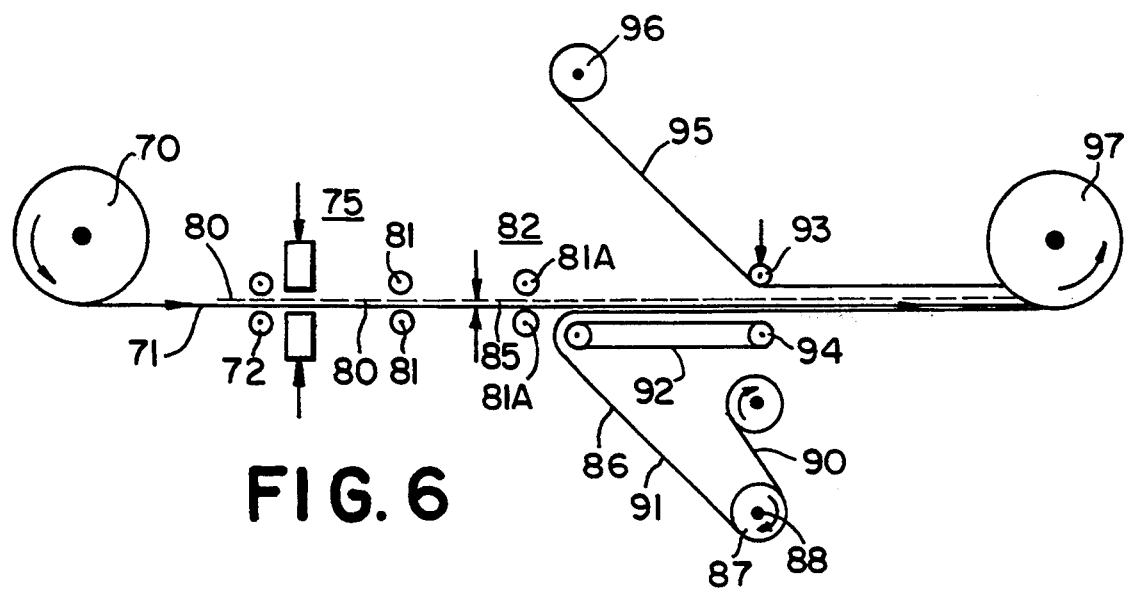
FIG. 6 is a diagrammatic view of the apparatus for manufacturing leaf anodes.
Figure 7:
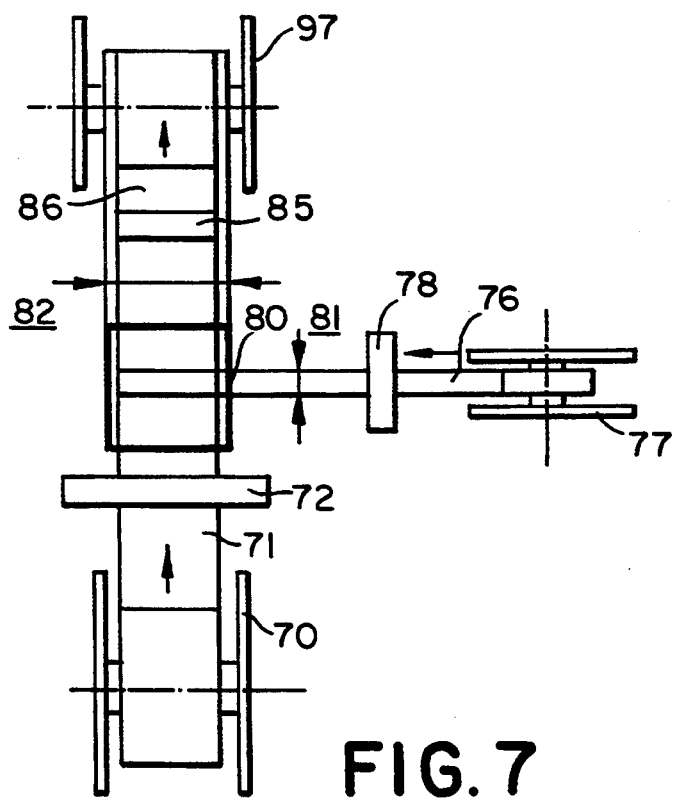
FIG. 7 is a top plan view of a portion of the apparatus of FIG. 6.

Referring now more particularly to FIGS. 6 and 7 of the drawings the apparatus for manufacturing the anode components of single cell electrochemical devices is illustrated, and which may be located in a controlled inert atmosphere. A spool 70 is provided which has a length of anodic material 71 wound thereon which may be lithium metal foil or other desired suitable metal alloy foil.

The foil 71 as it unwinds from spool 70 is carried by rollers 72 to a terminal attaching station 75.

A length of terminal material 76 of well known type, such as nickel foil with a rough surface (not shown) facing the anodic material, is carried on a spool 77, which length is perpendicular to foil 71 and as it is unwound is carried by rollers 78 to the terminal attaching station 75, and onto foil 71.

The terminal material 76 is cut into terminals 80 by a cutter assembly 81 of well known type.

The terminals 80 are deposited one at a time on the foil 71, with the positioning of the foil 71 and the terminal material 76 synchronized so that terminals 80 are deposited at spaced locations on foil 71. As required, the terminals 80 are attached in station 75 by pressing the rough surface (not shown) of terminals 80 against the foil 71 which cold solders the terminals and the foil together.

It should be noted that, if a carbon coated current collector web is used for the anode such as in lithium-ion batteries, fuel cells or other batteries and electrochemical devices, then instead of foil 71 the terminals are attached in the same manner as described in the cathodic manufacture above of FIGS. 2 and 3, but the web is optionally cut into leaves similar to leaves 85. The carbon coated current collector web with described terminal attachment may also be used in capacitor and fuel cell manufacturing.

The anode foil 71 with attached terminals 80 is carried by rollers 81 to and passes between an optional cutter assembly 82, which may contain a laser cutter, where it engages rollers 81A, which assembly 82 then cuts the foil into leaf anodes 85 between terminals 80, which are then deposited on a length of adhesive tape 86, which should be wider than anode foil 71 and webs 11 and 101. The foil 71 is fed from a roll 87 carried on a spool 88 underneath the leaf anodes 85. The adhesive tape 86 has a length of release paper 90 removed therefrom so that as spool 88 unwinds the adhesive side 91 faces upwardly to receive and retain the leaf anodes 85 as described in the Application of Stephen F. Hope and Joseph B. Kejha, Ser. No. 08/281,014 filed on Jul. 27, 1994 and in U.S. Pat. No. 5,006,554.

The tape 86 is carried on an optional belt 92 to nip rollers 93 and 94 with a length of release paper or tape 95 from spool 96 introduced above the leaf anodes 85 and below roller 93 where they are pressed together, with both tapes being taken up by a driven spool 97 about which they are wound.

Referring now additionally to FIGS. 1, 1A and 1B, the assembly apparatus is therein illustrated and includes a spool 100 with a net web of insulating plastic 101 wound thereon in a box (not shown) which can be an extension of box 27 described above, or a separate box (not shown). The spool shaft 102 is engaged in a frame (not shown) for controlled unwinding. The web 101 from spool 100 extends down over roller 103 with its shaft 104 carried in a frame (not shown) and down into a dip tank 105 which is filled with a polymer electrolyte 106 in liquid state, which may be a hot melt. The web 101 extends under roller 107 on shaft 108, carried by tank 105, and travels upwardly between partially submerged optional wipe rollers 109 which control the thickness of the electrolyte on the web 101, and the web 101 is coated and encapsulated by the electrolyte.

The dip tank 105 may be connected by pipe 115 to a supply reservoir 116 of electrolyte to maintain the proper temperature and level of electrolyte.

The cathode spool 53 with coated web 11 and attached terminals 20 is also located in the assembly apparatus. The cathodic material coated web 11 is unrolled from spool 53 and travels upwardly between rollers 120 where an adhesive plastic tape 121 is joined thereto. The tape 121 has an adhesive covered side 122 which faces the web 11 and the tape is wider than the cathode and electrolyte webs 11 and 101. The adhesive may also be a polymer electrolyte. The adhesive tape 121 may also have a release paper or tape thereon which unwinds (not shown). If desired the cathode coated web 11 may optionally be moisturized with a liquid electrolyte by spraying, preferably with an ultrasonic sprayer 123, before assembly and then travels over rollers 124A, 124B and 124C.

The electrolyte web 101 is engaged from underneath by the cathode web 11 and both extend over a preferably large diameter roller 125 where they are forced together by tension forces in the webs 11 and 101. The webs 11 and 101 then travel through an optional solidification chamber 130 of well known type, such as a cooling or radiation cross linking chamber where the liquids solidify, but remain tacky. Any vaporized solvent from the electrolyte may be collected in a similar condenser, as described for cathode coating (not shown).

The anode spool 97 with tape 86 carrying leaf anodes 85 is also in the box (not shown) and located above the webs 11 and 101 as they exit the solidification chamber 130.

The anode leaf carrying tape 86 which is wider than anode leaves 85, and may be the same width as tape 121 is unwound from spool 97 and laid down on top of the web 101. As the tape 86 unwinds, the release paper 95 is unwound, extends over roller 131 and is taken up by spool 132, exposing the adhesive portion of tape 86 which faces the web 101. The tape 86, webs 11 and 101 pass in preferably synchronized relation between a pair of soft squeegee rollers 134 which assemble them by pressure, after which they are engaged by a second pair of rollers 135 which deliver the layered assembly to an optional cutter station 140 for cutting, if desired. The cutter station 140 may include one or more blades 141 which are preferably of plastic or ceramic composition or the station 140 may contain a laser cutter (not shown).

The blades 141 cut the layer assembly preferably between the leaf anodes 85 to prevent shorting and to form individual cells 145 as shown in FIGS. 1A and 1B. The cells 145 are preferably picked up by a vacuum arm (not shown) of well known type, stacked with terminals connected as required, placed into a heat sealable metal foil bag coated with a plastic (not shown) which is heat sealed and then placed in a hard container (not shown) for puncture protection as described in the Application of Stephell F. Hope and Joseph B. Kejha, Ser. No. 08/281,014 filed on Jul. 27, 1994.

It should be noted that top and bottom tapes 86 and 121 may have side strips without adhesive and thus may be joined by heat sealing/welding by passing through a pair of spool shaped hot rollers (not shown).

If the optional cutter station 140 is omitted, the layered assembly may be rolled into a "jelly roll" cell or cells by a winding device (not shown), with terminals 20 and 80 connected as desired, and then sealed.

Referring now more particularly to FIGS. 8 and 9 of the drawings, the apparatus for assembly of bi-cells is illustrated.

The apparatus is similar to the apparatus of FIG. 1 which may also be in a box with a controlled inert atmosphere, in that a spool 100 with a net web of insulating plastic 101 is provided, which extends over roller 107 into dip tank 105, which is filled with polymer electrolyte 106 in liquid state. A spool 53 with a cathode coated web 11 which has unmasked terminals 20 thereon and may also be premoistened as described, extends to and meets web 101 at a roller 125. A spool of bottom plastic tape 121 is optionally provided, with adhesive 122 facing the web 11, which is wider than web 11, and which is underneath of web 11 and has release paper or tape 121A, which is wound onto a spool 121B as tape 121 unwinds. The tape 121, webs 11 and 101 unite as they are pulled over roller 125 and then pass through an optional solidification chamber 130, where the electrolyte may solidify if desired, but should preferably remain tacky.

A spool of foil 71 with terminals 80 is provided above web 101, which extends down through rollers 150 and 151 where the foil 71 is cut into anode leaves 85 by optional cutter 165, which may be a laser cutter. The anode leaves 85 are placed in spaced relation on top of web 101 and the combination passes between an optional squeegee mechanism which is a pair of soft squeegee rollers 155, a belt 166, release tape 156, rollers 160 and spool 157, which presses the anode leaves 85 onto coated web 101.

The roll of release paper or tape 156 may be fed on top of anode leaves 85 prior to rollers 155 and is removed by winding onto spool 157 after the combination passes a second set of rollers 160 and belt 166. All components of the described mechanism are speed synchronized with the combination.

If the optional squeegee mechanism is omitted, then the anode leaves 85 should be fed in spaced relation into nip rollers 170, and between the electrolyte coated webs 101 and 101A.

In a mirror image, a second spool 100A of insulating plastic net web 101A is provided, to the right in FIG. 8, which is pulled through a second dip tank 105A which is filled with polymer electrolyte 106A in liquid state. A second spool 53A with a second cathode coated web 11A is provided which has unmasked terminals 20 11A thereon, and may also be moistened as described and which joins the web 101A from underneath, after tank 105A, and they are pulled over a second roller 125A.

An optional spool of second adhesive plastic tape 121A may be provided which tape is wider than the webs 11, 11A, 101, and 101A, and foil 71, and is fed from the bottom underneath roller 125A, under web 11A. The tape 121A, webs 11A and 101A pass through an optional solidification chamber 130A over roller 125A and down on top of anode leaves 85, which pass through driven nip rollers 170, which press the top tape 121A, webs 11A and 101A, leaf anodes 85, webs 11 and 101 and bottom tape 121 together in preferably synchronized relation to form a bi-cell assembly. The layered assembly may be optionally and preferably cut between the anode leaves 85 as shown in FIG. 9 by cutter station 140, which may contain a laser cutter, to form individual bi-cells 175 which are fed between rollers 176 and 177, picked up by a vacuum arm (not shown), and stacked and packaged as described for single cells, or deposited into a receiving bin 180.

If the layered assembly is not cut into cells, it may be optionally rolled into a "jelly roll" cell or cells by a winding device (not shown) and sealed as described for single cells.

It should be apparent that similarly, additional layers may be inserted or added as desired to form bi-polar electrochemical devices.

The described apparatus and methods may be also used for liquid electrolyte batteries, fuel cells, capacitors and other electrochemical devices, in which the polymer electrolyte is replaced by a liquid electrolyte and the net webs 101 and 101A are replaced by separator webs, preferably of porous plastic membrane, and solidification chambers 130 and 130A are omitted.

Accordingly, apparatus and method have been described with which the objects of the invention are achieved.

I claim:

1. Apparatus for automatic mass production and packaging of a plurality of electrochemical single cells which comprises a spool containing a web of cathode coated current collector wound thereon, a plurality of spaced terminals attached to said collector web, a spool containing a length of adhesive tape wound thereon, a length of anode material with terminals thereon in spaced relation and carried by said adhesive tape, release paper or tape on said adhesive tape and anode material in overlying relation, a spool containing a length of insulating plastic net web, a tank containing a quantity of liquid polymer electrolyte, electrolyte coating means including roller means in said tank and in contact with said plastic net web to cause said net web to be pulled through said tank to coat and to encapsulate said net web with electrolyte, roller means in contact with said length of cathode coated web to advance said web into intimate contact with said electrolyte coated net web to cause said webs to join, means for removing said release paper or tape from said anode carrying tape, means for advancing said anode carrying tape into contact with said electrolyte coated web, means for pressing said webs and said anodes and tapes together to form at least one cell having a layered assembly.

2. Apparatus for automatic mass production and packaging of a plurality of electrochemical bi-cells which comprises a spool containing a first web of cathode coated current collector wound thereon, a plurality of spaced terminals attached to said collector web, a spool containing a length of anode material with terminals attached thereon, a spool containing a first length of insulating plastic net web, a first tank containing a quantity of liquid polymer electrolyte, first electrolyte coating means including roller means in said tank and in contact with said first plastic net web to cause said net web to be pulled through said tank to coat and to encapsulate said net web with electrolyte, first roller means in contact with said first length of cathode coated web to advance said web into intimate contact with said first electrolyte coated net web to cause said webs to join, means for advancing said anode length into contact with said first electrolyte coated web, a spool containing a second web of cathode coated current collector wound thereon, a plurality of spaced terminals attached to said second collector web, a spool containing a second length of insulating plastic net web, a second tank containing a quantity of liquid polymer electrolyte, a second electrolyte coating means including roller means in said tank and in contact with said second plastic net web to cause said net web to be pulled through said tank to coat and encapsulate said net web with electrolyte, second roller means in contact with said second length of cathode coated collector web to advance said web into intimate contact with said second electrolyte coated net web to cause said webs to join, roller means for advancing said second webs on top of and into contact with said anode, means for pressing said webs and said anode together to form at least one cell having a layered assembly.

3. Apparatus for automatic mass production and packaging of a plurality of electrochemical single cells as defined in claim 1 in which means are provided to attach a plurality of masked spaced terminals to said current collector, means are provided to coat said current collector and masked terminals with cathode material, and means are provided to unmask said terminals after cathode coating.

4. Apparatus for automatic mass production and packaging of a plurality of electrochemical bi-cells as defined in claim 2 in which means are provided to attach a plurality of masked spaced terminals to said first and second current collectors, means are provided to coat said first and second current collectors and masked terminals with cathode material, and means are provided to unmask said terminals after cathode coating.

5. Apparatus for automatic mass production and packaging of electrochemical cells as defined in claims 1 or 2 in which said apparatus is contained in a box, and said box has a controlled atmosphere therein.

6. Apparatus for automatic mass production and packaging of single electrochemical cells as defined in claim 1 in which a bottom plastic adhesive tape is provided in adherent contact with said cathode coated collector web.

7. Apparatus for automatic mass production and packaging of single electrochemical cells as defined in claims 1 or 2 in which said cathode material on said webs is liquid.

8. Apparatus for automatic mass production and packaging of single electrochemical cells as defined in claims 1 or 2 in which said electrolyte coating is liquid.

9. Apparatus for automatic mass production and packaging of single electrochemical cells as defined in claims 1 or 2 in which means are provided for solidifying said cathode and said electrolyte coatings.

10. Apparatus for automatic mass production and packaging of cells as defined in claim 1 in which means are provided to cut said anode material into leaves which are deposited in spaced relation on said adhesive tape.

11. Apparatus for automatic mass production and packaging of cells as defined in claim 2 in which means are provided to cut said anode material into lengths which are deposited in spaced relation on said first electrolyte coated net web.

12. Apparatus for automatic mass production and packaging of cells as defined in claims 1 or 2 in which means are provided for cutting said layered assembly to form individual cells, and means are provided for stacking and packaging said cells.

13. Apparatus for automatic mass production and packaging of cells as defined in claims 1 or 2 in which said cathode material is moistened by applying additional liquid electrolyte thereto prior to joining with said electrolyte coated net web.

14. Apparatus for automatic mass production and packaging of cells as defined in claim 2 in which additional means are provided for pressing said first webs and said anode material to form a layered assembly.

15. Apparatus for automatic mass production and packaging of cells as defined in claims 1 or 2 in which said coated cathode material on said collector web is solidified in a vertical solidification chamber.

16. Apparatus for automatic mass production and packaging of cells as defined in claim 2 in which a spool containing a first length of adhesive plastic tape is provided in adhesive contact with said first cathode coated web between said web and said first roller means.

17. Apparatus for automatic mass production and packaging of cells as defined in claim 2 in which a spool containing a second length of adhesive plastic tape is provided in adhesive contact with said second cathode coated web between said second web and said second roller means.

18. Apparatus for automatic mass production and packaging of cells as defined in claims 6, or 10, or 16, or 17 in which means are provided for heat sealing said adhesive tapes.

19. Apparatus for automatic mass production and packaging of cells as defined in claims 6, or 10, or 16, or 17 in which said adhesive is a polymer electrolyte.

20. Apparatus for automatic mass production and packaging of cells as defined in claims 6, or 10, or 16, or 17 in which said adhesive tapes have a release tape thereon.

21. Apparatus for automatic mass production and packaging of cells as defined in claim 20 in which means are provided for winding said release tape.

22. Apparatus for automatic mass production and packaging of cells as defined in claims 1 or 2 in which additional layers of electrolyte, cathode and anode are added or inserted to form bi-polar electrochemical devices.

23. Apparatus for automatic mass production and packaging of cells as defined in claims 1 or 2 in which means are provided for said layered assembly to be is rolled into a jelly roll cell or cells and packaged.

24. Apparatus for automatic mass production and packaging of cells as defined in claims 10, or 11, or 12 in which said cutting means is a laser cutter.

25. Apparatus for automatic mass production and packaging of cells as defined in claims 1 or 2 in which said collector web is of carbon fibers, and said terminals are attached to said collector web by soldering and solder encapsulation.

26. Apparatus for automatic mass production and packaging of electrochemical devices as defined in claims 1 or 2 which is used for production of capacitors.

27. Apparatus for automatic mass production and packaging of cells as defined in claims 1 or 2 in which said webs and said anodes and said tapes are pressed together in synchronized relation.

* * * * *